US011748908B1

(12) United States Patent
Barsky et al.

(10) Patent No.: US 11,748,908 B1
(45) Date of Patent: Sep. 5, 2023

(54) SYSTEMS AND METHODS FOR GENERATING POINT-ACCURATE THREE-DIMENSIONAL MODELS WITH POINT-ACCURATE COLOR INFORMATION FROM A NON-COSITED CAPTURE

(71) Applicant: Illuscio, Inc., Culver City, CA (US)

(72) Inventors: Kevan Spencer Barsky, Santa Monica, CA (US); Nicholas Frank Hammerle, Los Angeles, CA (US); Tim Sung, Los Angeles, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/177,501

(22) Filed: Mar. 2, 2023

Related U.S. Application Data

(63) Continuation of application No. 17/823,831, filed on Aug. 31, 2022, now Pat. No. 11,620,764.

(51) Int. Cl.
*G06T 7/73* (2017.01)
*G01S 17/89* (2020.01)
*G06T 7/33* (2017.01)

(52) U.S. Cl.
CPC ............... *G06T 7/75* (2017.01); *G01S 17/89* (2013.01); *G06T 7/344* (2017.01)

(58) Field of Classification Search
CPC ............ G06T 7/75; G06T 7/344; G01S 17/89
See application file for complete search history.

(56) References Cited

U.S. PATENT DOCUMENTS

| 9,829,984 | B2 | 11/2017 | Dai et al. |
| 10,284,794 | B1 | 5/2019 | Francois et al. |
| 10,713,525 | B2 * | 7/2020 | Matsumoto ......... H04N 23/698 |
| 10,810,759 | B2 * | 10/2020 | Zimmerman .......... G06T 7/579 |
| 11,195,314 | B2 * | 12/2021 | Holzer .................... G06T 11/60 |
| 11,455,789 | B1 | 9/2022 | Sung |
| 11,501,410 | B1 | 11/2022 | Weingartner et al. |
| 11,527,017 | B1 * | 12/2022 | Good ....................... G06T 17/00 |
| 11,620,764 | B1 * | 4/2023 | Barsky .................... G01S 17/86 |
| | | | 382/100 |
| 11,670,000 | B1 * | 6/2023 | Barsky ..................... G06T 7/75 |
| | | | 382/162 |
| 2011/0229021 | A1 | 9/2011 | Mei |

(Continued)

*Primary Examiner* — Mia M Thomas
(74) *Attorney, Agent, or Firm* — ANSARI KATIRAEI LLP; Arman Katiraei; Sadiq Ansari

(57) ABSTRACT

Disclosed is a system and associated methods for generating a point-accurate three-dimensional ("3D") model of a scene with point-accurate color information from a non-cosited capture of the scene. The system may define a first model based on positional measurements obtained from a first device. The system may capture images of the scene with a different set of devices, and may generate a second model from a photogrammetry modeling of the images. The system may align the models in order to determine positioning of the set of devices relative to the first model, and may select a particular device that captures descriptive characteristics from a position in the scene that is represented by the positional elements of a particular data point. The system may define non-positional elements of the particular data point based on the descriptive characteristics captured by the particular device.

20 Claims, 7 Drawing Sheets

(56) References Cited

U.S. PATENT DOCUMENTS

| | | | |
|---|---|---|---|
| 2015/0070468 A1* | 3/2015 | Pfeffer | G06T 7/55 |
| | | | 348/46 |
| 2015/0279118 A1* | 10/2015 | Dou | G06T 7/292 |
| | | | 345/427 |
| 2016/0334276 A1 | 11/2016 | Pluviange | |
| 2019/0026554 A1 | 1/2019 | Rainey et al. | |
| 2019/0043257 A1 | 2/2019 | Kirk et al. | |
| 2019/0080499 A1* | 3/2019 | Holzer | G06T 11/60 |
| 2019/0188906 A1* | 6/2019 | Krishna | G06T 7/579 |
| 2019/0311546 A1* | 10/2019 | Tay | G05D 1/0088 |
| 2020/0380765 A1* | 12/2020 | Thudor | G06T 15/04 |
| 2020/0404171 A1* | 12/2020 | Talbert | A61B 1/0655 |
| 2022/0120863 A1* | 4/2022 | Woloschyn | G01S 7/4808 |
| 2022/0126117 A1 | 4/2022 | Voronenko et al. | |
| 2022/0307819 A1* | 9/2022 | Kadambi | H04N 13/257 |

\* cited by examiner

SYSTEMS AND METHODS FOR GENERATING POINT-ACCURATE THREE-DIMENSIONAL MODELS WITH POINT-ACCURATE COLOR INFORMATION FROM A NON-COSITED CAPTURE

CLAIM OF BENEFIT TO RELATED APPLICATIONS

This application is a continuation of United States nonprovisional application Ser. No. 17/823,831 entitled "Systems and Methods for Generating Point-Accurate Three-Dimensional Models with Point-Accurate Color Information from a Non-Cosited Capture" filed Aug. 31, 2022. The contents of application Ser. No. 17/823,831 are hereby incorporated by reference.

BACKGROUND

Photogrammetry is a technique for generating three-dimensional ("3D") models from a set of two-dimensional ("2D") images that are taken of the same scene from different positions. Photogrammetry may compute a 3D position for the position of each surface, feature, and/or object that is captured in the images based on a relative or approximate mapping of the surface, feature, and/or object position in two or more images. As a result, some surfaces, features, and/or objects may be distorted, enlarged, shrunk, and/or other otherwise inaccurately represented because the 3D models of those surfaces, features, and/or objects are approximations generated from 2D images rather than a direct 3D mapping. Similarly, colors and/or other descriptive characteristics of the 3D model may be inaccurately represented when an averaging or other computation is used to derive the color information for a particular surface, feature, and/or object from two or more 2D images that were captured by cameras at different positions, wherein each camera may receive different amounts of light, may capture different reflections, may be offset from the particular surface, feature, and/or object by a different degree, and/or may otherwise perform a capture of the particular surface, feature, and/or object that yields different color information for that particular surface, feature, and/or object.

DETAILED DESCRIPTION OF PREFERRED EMBODIMENTS

The following detailed description refers to the accompanying drawings. The same reference numbers in different drawings may identify the same or similar elements.

Provided are systems and methods for generating a point-accurate three-dimensional ("3D") model of a scene with point-accurate color information and/or other descriptive characteristics for each modeled point from a non-cosited capture of the scene. Specifically, different imaging devices may be used to capture different properties of the scene from different positions. However, rather than use photogrammetry to approximate feature positions, a multi-layer 3D modeling and mapping ("MMM") system of some embodiments may directly map the positions of each point for each feature from the scene in 3D space using a high-resolution depth scanner. The MMM system may generate a first point-accurate 3D model of the scene based on positional measurements of the high-resolution depth scanner. The MMM system may accurately map color information and/or other descriptive characteristics from different images captured by a different set of imaging devices to the different points of the first point-accurate 3D model. The descriptive characteristic mapping may include generating a second 3D model from the images captured by the different set of imaging devices, layering and scaling the second 3D model relative to the first point-accurate 3D model, determining positioning of each imaging device from the different set of imaging devices based on the layering and scaling of the 3D models, and associating descriptive characteristics from different photosites of the imaging devices to the different points in the first point-accurate 3D model based on the determined positioning of the imaging devices.

Figure 1:
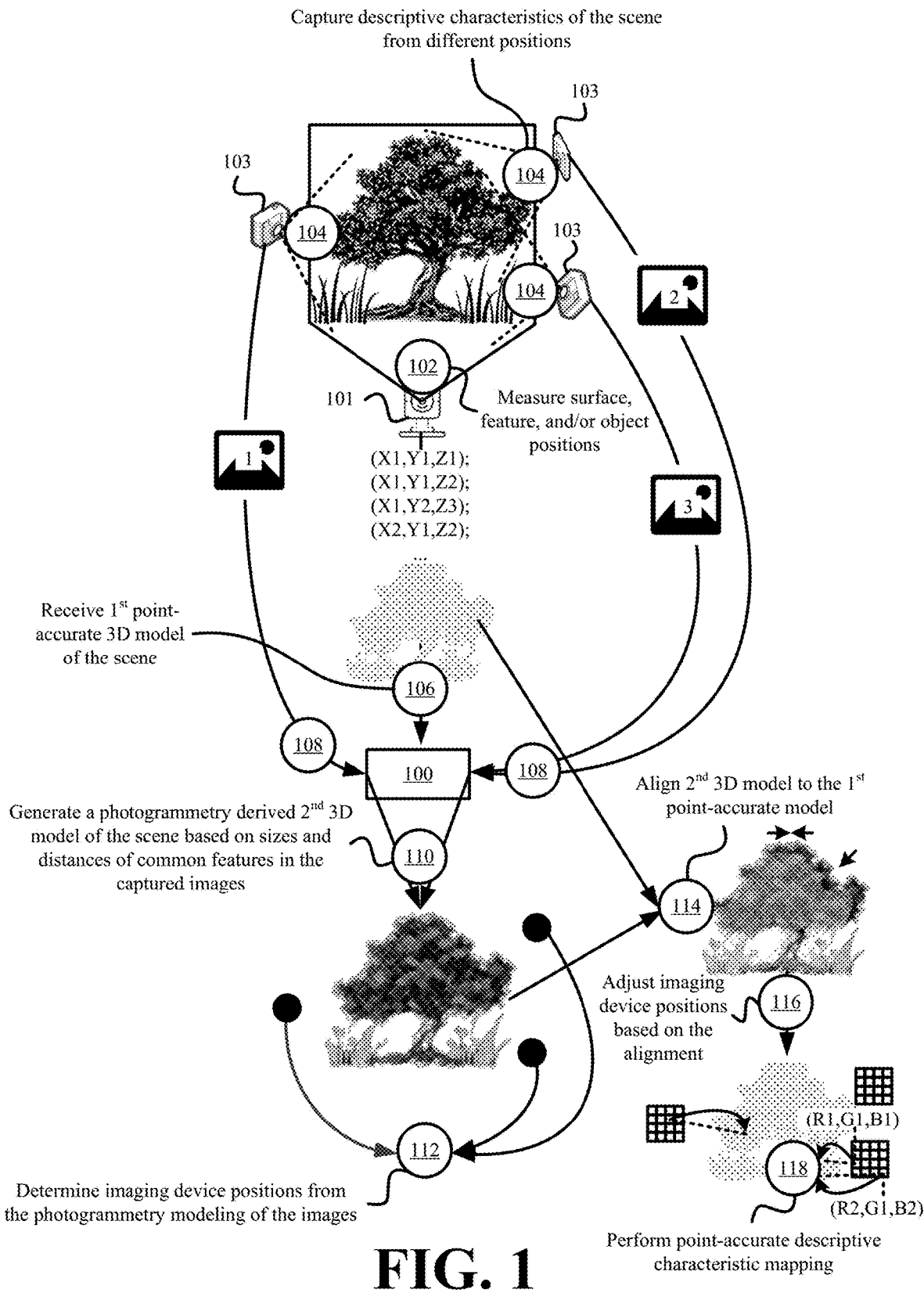
FIG. 1 illustrates an example of generating a point-accurate three-dimensional ("3D") model of a scene with point-accurate descriptive characteristics from a non-cosited capture of the scene in accordance with some embodiments presented herein.

FIG. 1 illustrates an example of generating a point-accurate 3D model of a scene with point-accurate descriptive characteristics from a non-cosited capture of the scene in accordance with some embodiments presented herein. MMM system 100 may perform the non-cosited capture of the scene with a high-resolution depth scanner 101 and set of imaging devices 103, and may include one or more computing devices with one or more hardware processors that generate the point-accurate 3D model of the scene with the point-accurate descriptive characteristics based on the outputs of high-resolution depth scanner 101 and set of imaging devices 103.

The non-cosited capture may include using high-resolution depth scanner 101 to accurately measure (at 102) the position of each point from each surface, feature, and/or object of the scene from one or more of a first set of positions, and using second set of imaging devices 103 to capture (at 104) the descriptive characteristics (e.g., color, lighting, shading, reflectivity, etc.) of the same surfaces, features, and/or objects from the same scene, but from different positions than the high-resolution depth scanner 101.

High-resolution depth scanner 101 may be a 3D or depth-sensing camera, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, structured or patterned light imaging device, and/or other imaging equipment for 3D objects, volumetric objects, or 3D environments. High-resolution depth scanner 101 may be placed at the center of the scene, and may accurately measure (at 102) the position of each point from each surface, feature, and/or object of the scene based on the intensity and/or time with which lasers, light, sound, and/or other signals reflect off each point, the distortion of a structured or patterned light at each point, and/or other depth measuring techniques. In some embodiments, high-resolution depth scanner 101 may measure (at 102) the position of each point within a micrometer of position, and the number of points measured by high-resolution depth scanner 101 may be based on the density or number of lasers emitted from high-resolution depth scanner 101 over a given area or region.

High-resolution depth scanner 101 may map the position of each measured point scanned from each surface, feature, and/or object of the scene to a generated 3D space. For instance, high-resolution depth scanner 101 may generate a point cloud with a set of data points that are distributed in 3D space. Each data point of the set of data points may be defined with an x, y, and z coordinate position to represent the position of a corresponding point from a surface, feature, and/or object of the scene measured by high-resolution depth scanner 101.

Each point cloud data point may be defined with a plurality of elements. The plurality of elements may include a first set of positional elements, and a second set of non-positional or descriptive elements. The positional elements may include coordinates within 3D space that are defined according to the measurements of high-resolution depth scanner 101. The non-positional elements may initially be empty or contain null values as the high-resolution depth scanner 101 may be capable of capturing positional information only. Generating the point-accurate 3D model of the scene with the point-accurate descriptive characteristics from the non-cosited capture may include defining the non-positional elements of each point cloud data point based on descriptive characteristics for the corresponding point in the scene captured in one or more images generated by set of imaging devices 103.

In some embodiments, the descriptive characteristics captured by set of imaging device 103 may include color data. The color data may be represented using red, green, blue ("RGB"), and/or other values. In some embodiments, the descriptive characteristics may provide the chrominance, hardness, translucence, reflectivity, luminance, metallic characteristics, roughness, specular, diffuse, albedo, index of refraction ("IOR"), and/or other properties of the imaged surface, feature, or object point. In some embodiments, the non-positional elements may directly identify a material property or other classification for a data point. For instance, a first data point may be defined with a non-positional element with a value that identifies the material property of "aluminum", a second data point may be defined with a non-positional element with a value that identifies the material property of "steel", and a third data point may be defined with a non-positional element with a value that identifies the material property of "plastic".

In some embodiments, the characteristics may be related to properties of the device used to generate each of data points. For instance, the characteristics may include a Tesla strength value to quantify the strength of the magnetic field that was used in detecting and/or imaging the surface, feature, or article represented by a particular point cloud data point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding data point in 3D space.

Accordingly, to populate the point cloud and/or the point-accurate 3D model with the point-accurate descriptive characteristics, MMM system 100 may use set of imaging devices 103 to perform a non-cosited capture of the scene. In some embodiments, each imaging device of set of imaging devices 103 may be camera or other device with several photosites on a sensor that accurately capture the color, lighting, shading, reflectivity, and/or other descriptive characteristics of the scene. In some such embodiments, one or more of the descriptive characteristics (e.g., material property) may be derived or determined from the color, lighting, shading, reflectivity, and/or visual attributes captured in the images. The non-cosited capture may include capturing the descriptive characteristics of the scene with set of imaging devices 103 located at one or more different positions than high-resolution depth scanner 101. For instance, high-resolution depth scanner 101 may be placed at the center of the scene, whereas set of imaging devices 103 may be placed at various positions about the border of the scene being modeled.

MMM system 100 may receive (at 106) the positional measurements and/or point cloud generated by high-resolution depth scanner 101 as a first set of inputs, and may receive (at 108) the images that are captured by set of imaging devices 103 as a second set of inputs. MMM system 100 may generate (at 110) a second photogrammetry derived model of the scene based on the 2D images that are captured by set of imaging devices 103. Specifically, MMM system 100 may use one or more photogrammetry techniques to generate (at 110) the second 3D model of the scene based on the different angles and distances at which the surfaces, features, and/or objects of the scene are captured in the 2D images. The second 3D model of the scene may be of lower resolution and detail than the first point-accurate 3D model since the second 3D model is generated based on distances that are calculated for the surfaces, features, and/or objects based on the different angles and distances captured in the images, and interpolating the shape and form of the surfaces, features, and/or objects captured from the different angles and distances, whereas the first point-accurate 3D model is direct mapping of positions detected from scanning the surface, features, and/or object of the scene.

MMM system 100 may determine (at 112) the position of each imaging device in set of imaging devices 103 from the photogrammetry modeling of the images. Specifically, in generating the second 3D model, MMM system 100 may determine the position in the captured scene from which each imaging device captured its respective image. MMM system 100 may map the position in the captured scene to a corresponding position in the 3D space of the second 3D model representing the captured scene.

MMM system 100 may align (at 114) the second 3D model with the first point-accurate 3D model. Aligning (at 114) the models may include changing the scale, size, orientation, position, and/or other aspects of the second 3D model to best match the positioning of the point-accurate surfaces, features, and/or objects within the first point-accurate 3D model.

MMM system 100 may adjust (at 116) the photogrammetry derived positions of set of imaging devices 103 based on the aligning (at 114) of the second 3D model with the first point-accurate 3D model. In some embodiments, the adjustments (at 116) the photogrammetry derived positions of set of imaging devices 103 may be proportional to the adjustments made to align (at 114) the second 3D model with the first point-accurate 3D model. Adjusting (at 116) the imaging device positions may include aligning the imaging device positions relative to the 3D space of the first point-accurate 3D model.

MMM system 100 may perform (at 118) the point-accurate descriptive characteristic mapping based on the adjusted (at 116) imaging device positioning and the positions of the data points in the first point-accurate 3D model. Performing (at 118) the point-accurate descriptive characteristic mapping may include selecting a data point from the first point-accurate 3D model with empty or null non-positional elements, selecting the imaging device with an adjusted position that is directed towards or that is most directly facing the selected data point, determining the one or more photosites of the selected imaging device or pixels from the image captured by the selected imaging device that captured the descriptive characteristics of the selected point, and attributing the descriptive characteristics captured by those photosites or pixels to the selected data point within the first point-accurate 3D model. MMM system 100 may perform (at 118) the point-accurate descriptive charactered mapping for each data point of the first point-accurate 3D model. In this manner, MMM system 100 may perform the point-accurate mapping of the descriptive characteristics to the point-accurate modeling of the scene. More specifically, MMM system 100 may precisely determine the one or more photosites of a particular imaging device from set of imaging devices 103 that directly captured the descriptive characteristics of a particular point within the scene, and may directly map the descriptive characteristics captured by those photosites to the point in the point-accurate 3D model that directly maps to and captures the position of the particular point within the scene.

Figure 2:
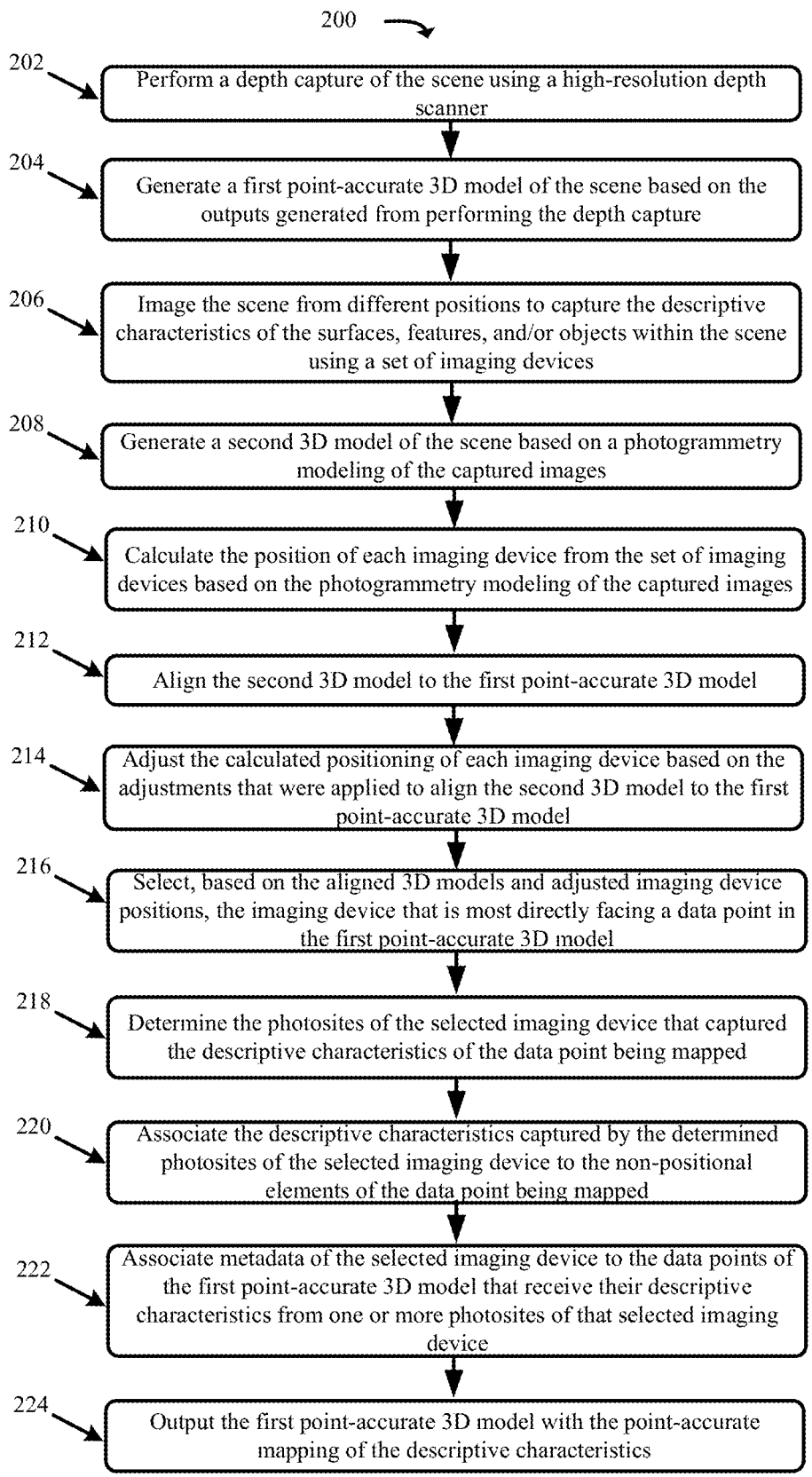
FIG. 2 presents a process for generating the point-accurate 3D model with point-accurate descriptive characteristics from a non-cosited capture of a scene in accordance with some embodiments presented herein.

FIG. 2 presents a process 200 for generating the point-accurate 3D model with point-accurate descriptive characteristics from a non-cosited capture of a scene in accordance with some embodiments presented herein. Process 200 may be implemented by MMM system 100 in conjunction with outputs generated by high-resolution depth scanner 101 and imaging devices 103.

Process 200 may include performing (at 202) a depth capture of the scene using high-resolution depth scanner 101. Performing (at 202) the depth capture may include measuring the positions in 3D space of different points about different surfaces, features, and/or objects within the scene. In some embodiments, performing (at 202) the depth capture may include obtaining x, y, and z coordinate positions for each detected point about a surface, feature, and/or object of the scene using LiDAR, structured light patterns, time-of-flight, and/or other depth or positional measurement techniques.

Process 200 may include generating (at 204) a first point-accurate 3D model of the scene based on the outputs generated from performing (at 202) the depth capture. In some embodiments, the first point-accurate 3D model may be a point cloud or some other 3D representation of the scene. The first point-accurate 3D model may lack or may contain inaccurate color data and/or other descriptive characteristics for the points within the first point-accurate 3D model. In other words, the first point-accurate 3D model may accurately capture the positioning and structure of the different surfaces, features, and/or objects in the scene down to one micrometer of precision depending on the resolution of high-resolution depth scanner 101, but may lack the color data for those points.

Process 200 may include imaging (at 206) the scene from different positions to capture the descriptive characteristics of the surfaces, features, and/or objects within the scene using set of imaging devices 103. In some embodiments, imaging (at 206) the scene may include positioning a single imaging device at different locations about the scene, and capturing an image of the scene from each location. In some embodiments, imaging (at 206) the scene may include positioning two or more imaging devices of set of imaging devices 103 at different locations about the scene, and capturing two or more images of the scene from the different locations. Each imaging device 103 may include a sensor with multiple photosites that capture the visible light spectrum or RGB frequencies of the electromagnetic spectrum that reflect off surfaces, features, and/or objects of the scene. In some embodiments, each imaging device 103 may perform a hyperspectral capture of visible and non-visible light frequencies (e.g., infrared, ultraviolet, etc.). In some embodiments, the descriptive characteristics may be represented as RGB or other values that are converted from raw mosaic values captured by the sensors of set of imaging devices 103. In some other embodiments, the descriptive characteristics may be the raw values that are captured by each of the sensor photosites. This may include the raw values that are captured by a Foveon sensor, a charge-coupled device ("CCD"), a three-CCD ("3CCD) system with a prism or film, a mosaic sensor, and/or other sensors that are not mosaic.

Process 200 may include generating (at 208) a second 3D model of the scene based on a photogrammetry modeling of the captured images. The photogrammetry modeling may include analyzing the captured images, aligning commonality detected within images taken from different locations (e.g., common surfaces, features, and/or objects captured from different positions and/or angles), and generating a 3D structure based on the distance, distortion, and/or other variations found between the common portions of the aligned images. The second 3D model may be less accurate than the first point-accurate 3D model because the second 3D model is derived from a set of 2D images rather than the direct 3D measurements used to construct the first point-accurate 3D model. Accordingly, the modeled surfaces, features, and/or objects of the scene in the second 3D model may be malformed, misaligned, of different sizes, of different shapes, and/or have other variations than the actual surfaces, features, and/or objects of the scene, whereas the first point-accurate 3D model may be a near identical representation with micrometer accuracy.

Process 200 may include calculating (at 210) the position of each imaging device from set of imaging devices 103 based on the photogrammetry modeling of the captured images. For instance, in aligning the commonality detected within the images taken from the different locations, MMM system 100 may determine a center point of the scene, and may determine the position of each imaging device relative to that center point, relative to detected commonality, and/or relative to one another. Calculating (at 210) the position of each imaging device may include assigning a position for each imaging device in the 3D space of the second 3D model.

Process 200 may include aligning (at 212) the second 3D model to the first point-accurate 3D model. Aligning (at 212) the 3D models may include layering the second 3D model over the first point-accurate 3D model, and scaling, resizing, skewing, rotating, and/or otherwise adjusting dimensions of the second 3D model to match or more accurately conform to the dimensions of the first point-accurate 3D model. Due to the differences in resolution (e.g., numbers and sizes of the data points, the primitive used to represent the features in each 3D model, etc.) and detail (e.g., variation in the coloring and non-positional elements at different locations) between the second 3D model and the first point-accurate 3D model, the alignment (at 212) is unlikely to produce a perfect layering. Nevertheless, MMM system 100 may compare different alignments to identify which positional layering, resizing, scaling, and/or other adjustments produce the greatest amount of matching between the two 3D models.

Process 200 may include adjusting (at 214) the calculated positioning of each imaging device based on the adjustments that were applied to align (at 212) the second 3D model to the first point-accurate 3D model. For instance, if the size of the second 3D model is reduced by 5% to align (at 212) the second 3D model with the first point-accurate 3D model, MMM system 100 may determine the adjusted positions of each imaging device in the reduced 3D space of the reduced size second 3D model. Similarly, if the alignment (at 212) involves rotating the second 3D model by some number of degrees, MMM system 100 may apply a similar rotation to the positions of each imaging device in the 3D space of the rotated second 3D model. Adjusting (at 214) the calculated positioning of each imaging device may involve changing the coordinates of the imaging device in the adjusted 3D space of the second 3D model that results from aligning (at 212) the two 3D models.

Process 200 may include performing a point-accurate mapping of color and/or other descriptive characteristics from the points, pixels, and/or other primitives of the second 3D model that are aligned with the data points of the first point-accurate 3D model based on the adjusted (at 214) imaging device positions. Process 200 and performing the point-accurate mapping of color and/or other descriptive characteristics may include selecting (at 216), based on the aligned (at 212) 3D models and adjusted (at 214) imaging device position, the imaging device that is most directly facing a data point in the first point-accurate 3D model. In some embodiments, the imaging device selection (at 216) is performed by determining the surface normal that is generated for a particular data point when scanning the scene or 3D environment with the high-resolution depth scanner and generating the data points of the first point-accurate 3D model, and identifying the imaging device that is most aligned with the surface normal of the particular data point.

Process 200 and performing the point-accurate mapping may include determining (at 218) the one or more photosites of the selected imaging device that captured the descriptive characteristics of the data point being mapped. In some embodiments, MMM system 100 may project or extend the surface normal of the data point in the aligned 3D space of the two 3D models until the projected surface normal reaches the position of the selected imaging device. In some embodiments, MMM system 100 may determine (at 218) where on the sensor of the selected imaging device the projected surface normal hits. Specifically, MMM system 100 may determine (at 218) which one or more photosites of the selected imaging device sensor are at the projected surface normal location. Alternatively, MMM system 100 may project rays that emulate the light reaching each photosite of the sensor of the selected imaging device, and may determine (at 218) which rays from which photosites reach the data point in the aligned 3d space of the two 3D models.

Process 200 and performing the point-accurate mapping may further include associating (at 220) or assigning the descriptive characteristics captured by the one or more photosites of the selected imaging device to the non-positional elements of the data point being mapped. Process 200 may perform the point-accurate mapping for each data point in the first point-accurate 3D model. Specifically, MMM system 100 may transfer and/or map the descriptive characteristics from different photosites of the different imaging devices that were used to generate the second 3D model to different data points whose surface normal projects onto those photosites in the overlaid 3D space of the aligned 3D models.

In some embodiments, associating (at 220) the descriptive characteristics may include writing the raw values captured by the one or more photosites into the non-positional elements of the mapped data points. The raw values may include the values that are output directly from the imaging device sensor prior to being converted in RGB values. The raw values may be subsequently post-processed using one or more debayering techniques when rendering the resulting point-accurate 3D model with the point-accurate descriptive characteristics. The debayering techniques may adjust the rendering of the data points, and the conversion of the raw values into color values.

In some other embodiments, associating (at 220) the descriptive characteristics may include writing RGB and/or other values that are derived from the raw values captured by the one or more photosites into the non-positional elements of the data points. For instance, the imaging device may implement a debayering technique when capturing the images of the scene or 3D environment such that the captured images contain RGB and/or other values of a specific image format.

Process 200 may include associating (at 222) metadata of the selected imaging device to the data points of the first point-accurate 3D model that receive their descriptive characteristics from one or more photosites of that selected imaging device. The metadata may include the imaging device settings that were used when capturing the descriptive characteristics encoded as part of the image used in constructing the second 3D model. For instance, the metadata may include the shutter speed, aperture, ISO setting, camera make and model, lens, and/or other settings, properties, and/or attributes of the imaging device at the time the descriptive characteristics were captured. Accordingly, different data points of the first point-accurate 3D model may receive different metadata based on the mapping of descriptive characteristics from different imaging devices to the different data points.

The metadata may be used to improve the processing and/or rendering of the data point non-positional elements. As will be described in more detail below, the metadata may be used to select and/or adjust settings of a debayering technique for rendering the raw values and/or other descriptive characteristics associated (at 220) to the non-positional data points of the first point-accurate 3D model.

Process 200 may include outputting (at 224) the first point-accurate 3D model with the point-accurate mapping of the descriptive characteristics. MMM system 100 may discard the second 3D model, and may use the first point-accurate 3D model with the point-accurate mapping of the descriptive characteristics in generating an accurate visualization of the represented scene or 3D environment. Specifically, the first point-accurate 3D model with the point-accurate mapping of the descriptive characteristics may provide the point-accurate or micrometer precision mapping for the positioning and the descriptive characteristics (e.g., coloring) of the surfaces, features, and/or objects within the scene or 3D environment.

Figure 3:
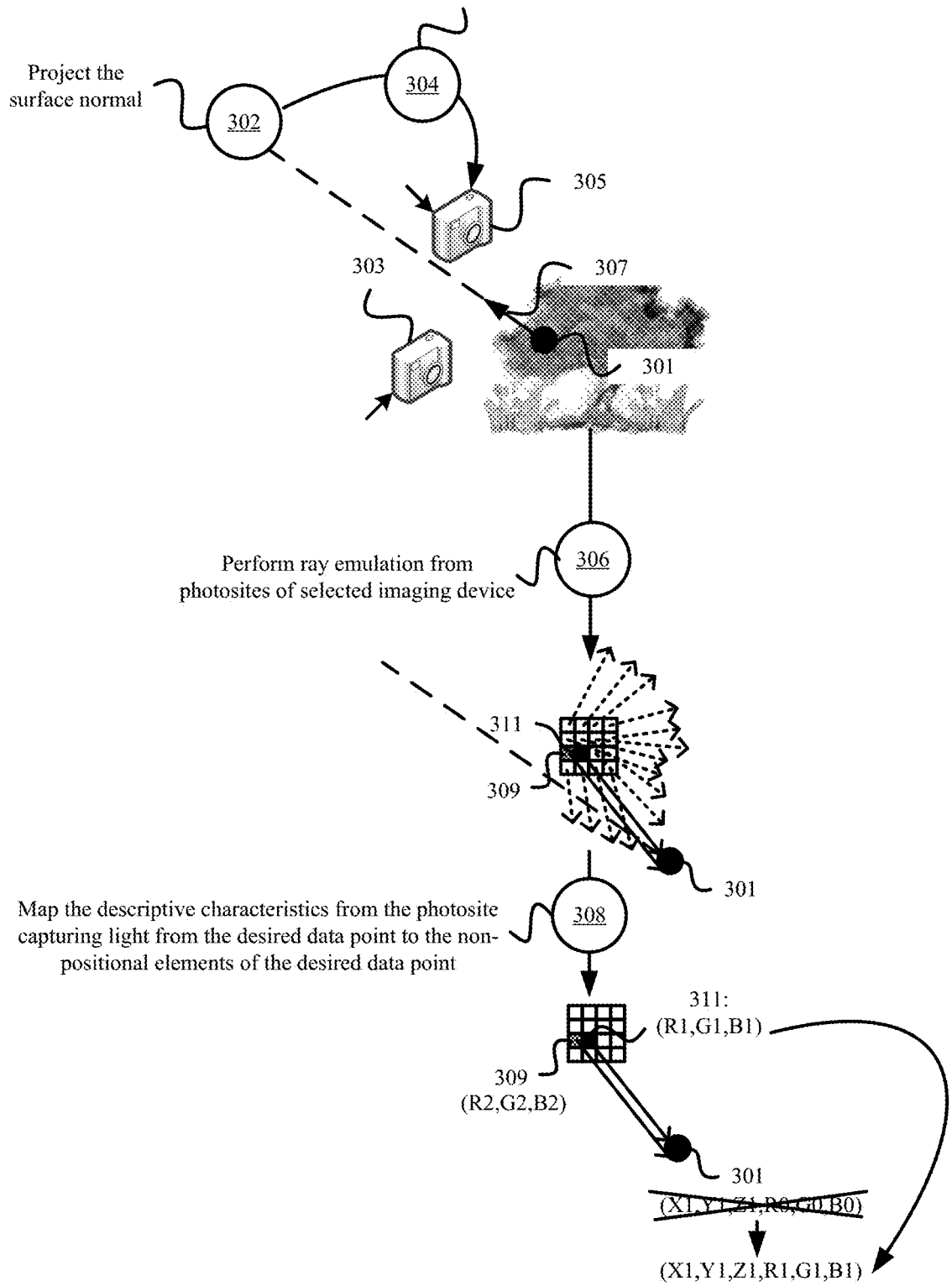
FIG. 3 illustrates an example for performing the point-accurate mapping of descriptive characteristics from a second photogrammetry-derived 3D model to a particular data point of a first point-accurate 3D model in accordance with some embodiments presented herein.

FIG. 3 illustrates an example for performing the point-accurate mapping of descriptive characteristics from a second photogrammetry-derived 3D model to particular data point 301 of a first point-accurate 3D model in accordance with some embodiments presented herein. FIG. 3 illustrates adjusted positions of two imaging devices 303 and 305 that are identified from a photogrammetry modeling of images taken of a particular scene or 3D environment by imaging devices 303 and 305, and aligning the second 3D model of the particular scene or 3D environment produced by the photogrammetry modeling with the first point-accurate 3D model of the same particular scene or 3D environment, wherein the first point-accurate 3D model is generated from measuring the positions of the surfaces, features, and/or objects within the same particular scene or 3D environment using a high-resolution depth scanner.

FIG. 3 further illustrates surface normal 307 of data point 301. Surface normal 307 may be determined from the high-resolution depth scanning of the particular scene or 3D environment. Surface normal 307 may represent a line, ray, or vector that is perpendicular to the surface, feature, or object represented by data point 301.

In some embodiments, MMM system 100 may extend and/or project (at 302) surface normal 307 outwards. As shown in FIG. 3, the projected surface normal does not directly contact either of imaging devices 303 and 305. However, the projected surface normal is closest to or directed towards the sensor of imaging device 305.

MMM system 100 may select (at 304) and perform the point-accurate mapping of the descriptive characteristics from imaging device 305 to data point 301. The selection (at 304) of imaging device 305 for the descriptive characteristic mapping may be in response to the projected surface normal being closer in proximity and/or in the direction of imaging device 305 than other imaging devices (e.g., imaging device 303).

To perform the point-accurate mapping of the descriptive characteristics, MMM system 100 may determine the position and orientation of each photosite from the sensor of imaging device 305, and may perform (at 306) a ray emulation to determine which one or more photosites of imaging device 305 capture the descriptive characteristics of data point 301. The ray emulation may involve generating one or more vectors from the direction of each photosite and in one or more offset angles from each photosite. For instance, MMM system 100 may generate a straight first vector from the position of the photosite, a second vector with a 5 degree northerly offset, a third vector with a 5 degree westerly offset, a fourth vector with a 5 degree easterly offset, and a fifth vector with a 5 degree southerly offset. The ray emulation may simulate the light from different points of the first point-accurate 3D model that reach each photosite. The ray emulation may further involve determining which of the generated vectors from which photosites contact data point 301.

As shown in FIG. 3, MMM system 100 may determine that photosites 309 and 311 from the sensor of imaging device 305 contact data point 301. MMM system 100 may further determine that photosite 311 is directly aligned with data point 301, whereas photosite 309 captures data point 301 at an offset angle. Accordingly, MMM system 100 may determine that photosite 311 provides a more accurate capture of the part of the feature in the scene or 3D environment that is represented by to data point 301, and may therefore map (at 308) and/or associate the descriptive characteristics captured by photosite 311 to the non-positional element of data point 301. For instance, MMM system 100 may identify the raw mosaic values or derived RGB values in the 2D image that was generated by photosite 311 of imaging device 305 (e.g., values of a specific pixel within the 2D image), and may copy the raw mosaic values or derived RGB values generated from photosite 311 to the non-positional elements of data point 301.

In this manner, MMM system 100 may generate the point-accurate 3D model of a scene or 3D environment with data points that have point-accurate descriptive characteristics compiled from different photosites of different cameras or imaging devices. For instance, MMM system 100 may assign RGB values that were captured by different photosites of the same imaging device or different imaging devices to two data points of the same point cloud, wherein the positions of the point cloud are precisely measured and/or recorded with a high-resolution depth scanner, while the descriptive characteristics are mapped over from the bets-aligned photosites of the imaging devices.

Figure 4:
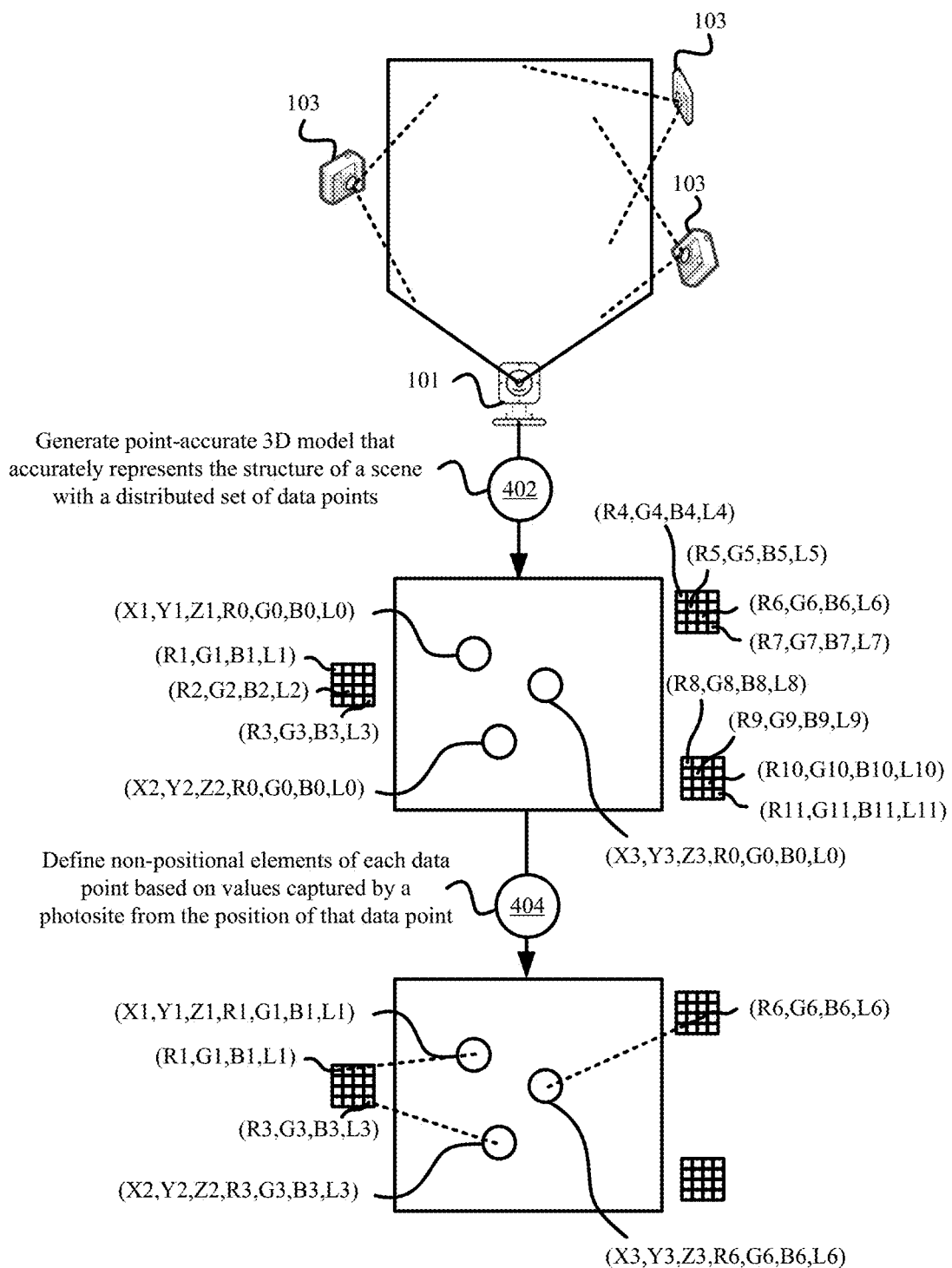
FIG. 4 illustrates the point-accurate mapping of descriptive characteristics from different imaging devices to data points of a point-accurate 3D model generated from a high-resolution depth scanner in accordance with some embodiments.

FIG. 4 illustrates the point-accurate mapping of descriptive characteristics from different imaging devices to data points of a point-accurate 3D model generated from a high-resolution depth scanner in accordance with some embodiments. High-resolution depth scanner 101 may generate (at 402) a point-accurate 3D model of a scene using several data points that are distributed in 3D space to accurately map the structure of the scene, but that lack accurate color information or descriptive characteristics for the data points. Accordingly, high-resolution depth scanner 101 may define each data point of the point-accurate 3D model with a first set of positional elements that specify the precise position of the surface, feature, or object portion represented by that data point in 3D space. The first set of positional elements may be defined based on measurements produced by high-resolution depth scanner 101.

MMM system 100 may then define (at 404) each data point with a second set of non-positional elements that specify descriptive characteristics (e.g., red ("R"), green ("G"), and blue ("B") color values as well as the luminance ("L")) of the data point. The second set of non-positional elements for a particular data point may include the color values and the metadata for the one or more photosites of the imaging device that captured those color values at the position of the particular data point. As shown in FIG. 4, the second set of non-positional elements may be defined (at 404) from color values captured by different photosites on sensors of different imaging devices that were positioned at different locations within the captured scene or 3D environment.

In some embodiments, MMM system 100 may use one or more artificial intelligence and/or machine learning ("AI/ML") techniques to improve the descriptive characteristics mapping. In some such embodiments, MMM system 100 may use the AI/ML techniques to determine when the descriptive characteristics that were captured by a photosite and that were selected to be mapped to a data point are less accurate than the descriptive characteristics of another photosite. For instance, the AI/ML techniques may detect that the descriptive characteristics of the selected photosite are affected by a reflection, refraction, lens distortion, angular distance, and/or other distortions, and are therefore a less accurate capture of the descriptive characteristics for the data point than the descriptive characteristics captured by the other photosite that is not subject to the same reflection, refraction, lens distortion, angular distance, and/or other distortion. In other words, the other photosite may perform an offset capture of the data point descriptive characteristics. However, that offset capture may be a more accurate representation of the data point descriptive characteristics than the photosite performing a direct or non-offset capture because the descriptive characteristics are not impacted by any distortions.

Figure 5:
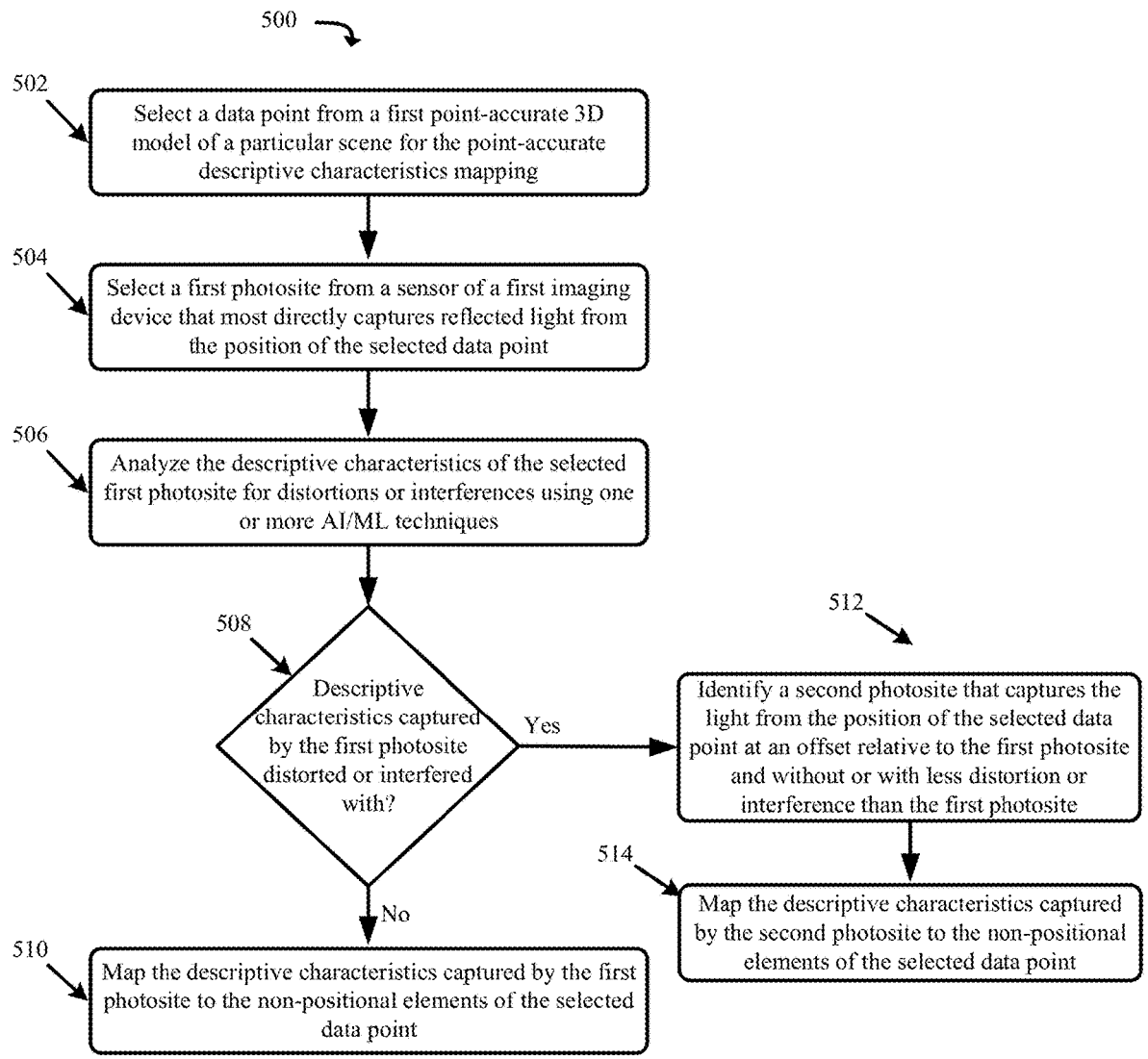
FIG. 5 presents a process for performing an artificial intelligence and/or machine learning ("AI/ML")-assisted point-accurate mapping of descriptive characteristics in accordance with some embodiments presented herein.

FIG. 5 presents a process 500 for performing the AI/ML-assisted point-accurate mapping of descriptive characteristics in accordance with some embodiments presented herein. Process 500 may be implemented by MMM system 100.

Process 500 may include selecting (at 502) a data point from a first point-accurate 3D model of a particular scene or 3D environment for the point-accurate descriptive characteristics mapping. The selected (at 502) data point may be defined with positional elements that accurately specify the position of a surface, feature, or object within a scene or 3D environment, and that were measured by high-resolution depth scanner 101. However, the selected (at 502) data point may lack or may be defined with inaccurate non-positional elements that represent the color values and/or other descriptive characteristics of that surface, feature, or object.

Process 500 may include selecting (at 504) a first photosite from a sensor of a first imaging device that is determined to most directly capture reflected light from the position of the selected (at 502) data point based on various rays that are projected out from the photosites of the first imaging device and/or other imaging devices that were used to capture the descriptive characteristics of the particular scene or 3D environment. The positions of the first imaging device and the other imaging devices may be derived from a photogrammetry modeling of the particular scene or 3D environment that is created from combining the 2D images of the particular scene or 3D environment captured by the imaging devices, and by adjusting the derived imaging device positions based on an aligning of the photogrammetry-derived 3D model of the particular scene or 3D environment with the with the first point-accurate 3D model of the same particular scene or 3D environment.

Process 500 may include analyzing (at 506) the descriptive characteristics of the selected (at 504) first photosite for distortions or interferences using one or more AI/ML techniques. The AI/ML techniques may compare the descriptive characteristics of the selected (at 504) against the descriptive characteristics of other photosites that capture light from the position of the selected (at 502) data point and/or other neighboring data points within the first point-accurate 3D model. If the descriptive characteristics of the first photosite are within range of the descriptive characteristics of other neighboring data points and/or within range of the descriptive characteristics captured by the other imaging devices, the AI/ML techniques may determine that there is no interference or distortion, or that the imaging devices are all subject to the same interference or distortion. However, if the descriptive characteristics captured by the first photosite are outside the ranges captured by the other photosites, the AI/ML techniques may further analyze the descriptive characteristics to determine the variance across the affected photosites and/or the positioning of the affected photosites. The AI/ML techniques may compare the variance and positioning of the affected photosites against models created for various distortions or interferences that affect the accurate capture of the descriptive characteristics. For instance, the AI/ML techniques may model the effect that reflections, refractions, shadows, over-exposed region, under-exposed regions, angular distance, and/or other distortions have across different photosites of imaging devices capturing the same region from different positions. Based on the modeling, the AI/ML techniques may determine whether the descriptive characteristic of the selected (at 504) first photosite accurately capture the descriptive characteristics of the selected (at 502) data points or contain some aberration or distortion that renders the descriptive characteristics inaccurate.

Process 500 may include determining (at 508) whether the descriptive characteristics captured by the selected (at 504) first photosite have been distorted or interfered with based on the analysis (at 506). In response to determining (at 508—No) that the descriptive characteristics captured by the first photosite have not experienced distortion or interference, process 500 may include mapping (at 510) the descriptive characteristics captured by the first photosite to the non-positional elements of the selected (at 502) data point. In response to determining (at 508—Yes) that the descriptive characteristics captured by the first photosite have experienced distortion or interference, process 500 may include identifying (at 512) a second photosite from the same sensor or the sensor of another imaging device that captures the light (e.g., descriptive characteristics) from the position of the selected (at 502) data point at an offset relative to the first photosite and/or that captures the light without or with less distortion or interference than the first photosite. For instance, the range of color values captured by the second photosite may be in range with the range of color values captured by photosites for other neighboring surfaces, features, or objects of the particular scene or 3D environment, or may be in range of color values captured for the same point in the particular scene or 3D environment by other photosites, whereas the range of color values captured by the first photosite may be out of range, thereby indicating some distortion or interference (e.g., a reflection, shadow, over exposure, etc.) with the capture by the first photosite. Accordingly, process 500 may include mapping (at 514) the descriptive characteristics captured by the second photosite, instead of the descriptive characteristics captured by the more directly aligned first photosite, to the non-positional elements of the selected (at 502) data point.

In this manner, MMM system 100 may use AI/ML to improve the quality of the descriptive characteristics that are mapped to the data points of the first point-accurate 3D model. Specifically, the AI/ML techniques may compare the descriptive characteristics captured by different photosites for the same point in the particular scene or 3D environment in order to determine if there are any reflections, refractions, highlights, over exposure, under exposure, and/or other issues that may impact the capture of the point by one or more of the photosites, and to select the least distorted photosite for the descriptive characteristic mapping.

MMM system 100 may also improve the visualization of the point-accurate 3D model with the point-accurate descriptive characteristics by performing a dynamic rendering of the descriptive characteristics that are mapped from the different photosites of the different imaging devices. In some embodiments, MMM system 100 may perform the dynamic rendering by using different debayering techniques to dynamically convert the descriptive characteristics from the raw mosaic values to RGB color values, and/or to dynamically convert the descriptive characteristics from the raw outputs of other RGB sensors that are not mosaic (e.g., a Foveon sensor, a CCD, a three-CCD ("3CCD) system with a prism or film, etc.) to the RGB color values. MMM system 100 may select the different debayering techniques for different sets of data points based on the metadata from the different imaging devices that is associated with those data points.

Figure 6:
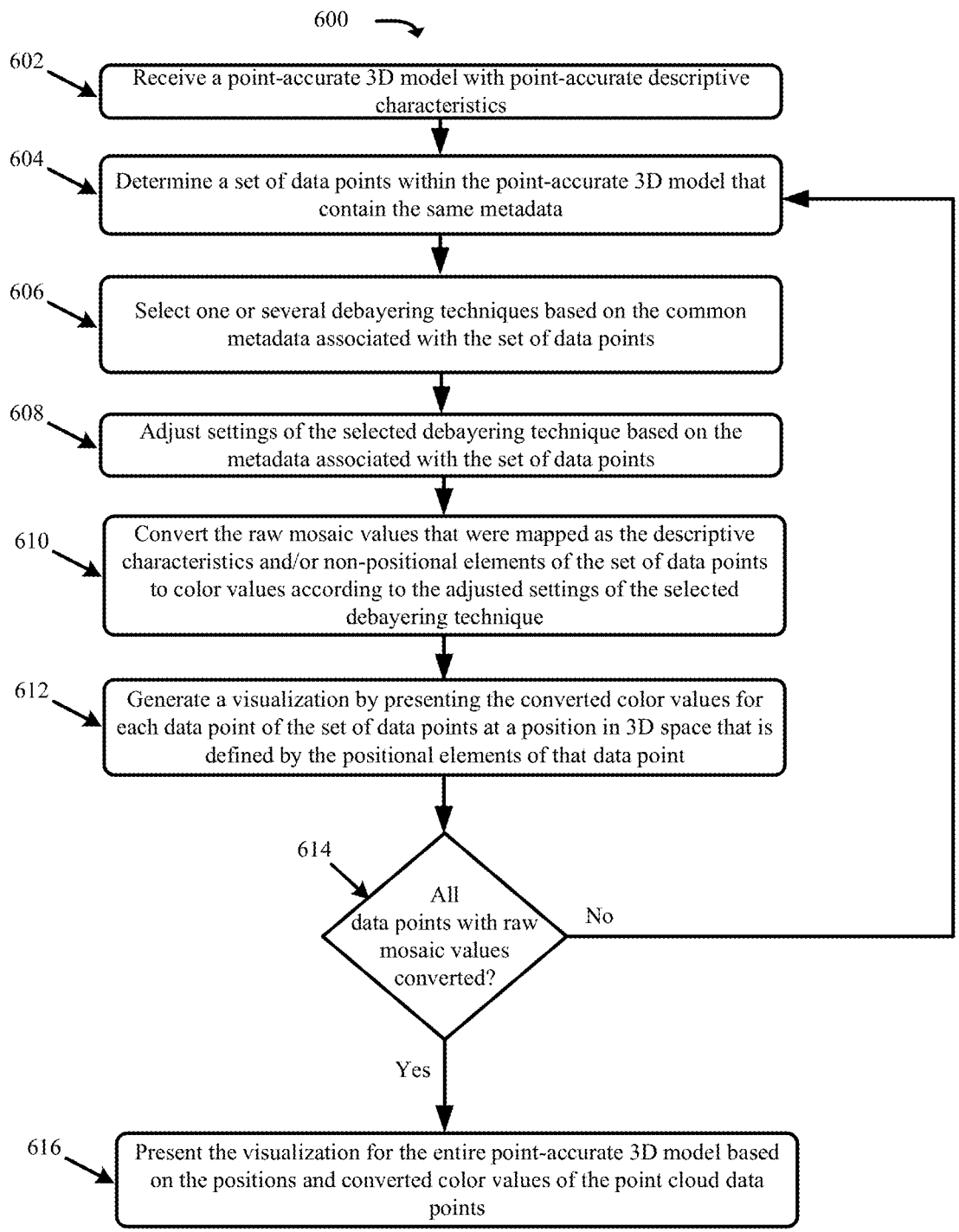
FIG. 6 presents a process for dynamically rendering a point-accurate 3D model with point-accurate descriptive characteristics in accordance with some embodiments presented herein.

FIG. 6 presents a process 600 for dynamically rendering a point-accurate 3D model with point-accurate descriptive characteristics in accordance with some embodiments presented herein. Process 600 may be performed by MMM system 100.

Process 600 may include receiving (at 602) a point-accurate 3D model with point-accurate descriptive characteristics. In some embodiments, MMM system 100 may receive (at 602) the point-accurate 3D model with point-accurate descriptive characteristics after generating the 3D model from a non-cosited capture of a particular scene or 3D environment in which the positional data for the data points of the point-accurate descriptive characteristics are precisely measured by one or more high-resolution depth scanners, and the color information and/or other non-positional data are captured by a different set of imaging devices that are located at different positions in the particular scene or 3D environment than the one or more high-resolution depth scanners. In some other embodiments, MMM system 100 may receive (at 602) the point-accurate 3D model with point-accurate descriptive characteristics in response to user input for processing, rendering, and/or otherwise accessing the 3D model.

Process 600 may include determining (at 604) a set of data points within the point-accurate 3D model that contain the same metadata. The set of data points having the same metadata may indicate that the descriptive characteristics mapped to the non-positional elements of that set of data points were captured using the same imaging device with the same settings. For instance, the metadata associated with each data point in the set of data points may include a camera identifier that identifies which of a set of cameras captured the descriptive characteristics mapped to those data points and/or the camera settings used to capture the mapped descriptive characteristics. The camera settings may include the shutter speed, aperture, ISO setting, lens, timestamp and/or other properties associated with the one or more images that captured different descriptive characteristics across different photosites of the camera sensor and that were mapped to different data points of the set of data points.

Process 600 may include selecting (at 606) a debayering technique from several available debayering techniques based on the common metadata associated with the set of data points. Each of the available debayering techniques may perform a different demosaicing or processing of the descriptive characteristics that involves a different conversion of the raw mosaic values stored as the descriptive characteristics to color values (e.g., RGB values). In some embodiments, a different debayering technique may be selected (at 606) for each different imaging device make and model that is identified in the data point metadata. In some embodiments, a different debayering technique may be selected (at 606) based on the camera settings used to capture the mapped descriptive characteristics. For instance, a first debayering technique may generate a more accurate visual representation from the raw mosaic values produced by a first imaging devices, and a second debayering technique may generate a more accurate visual representation from the raw mosaic values produced by a second imaging device.

In some embodiments, the selection (at 606) of the debayering technique may be manually configured. For instance, a user may manually identify which debayering technique produces the most accurate visual representation of a scene imaged by different imaging devices, and may configure MMM system 100 to select (at 606) the debayering techniques accordingly. In some other embodiments, MMM system 100 may automatically select (at 606) the debayering technique by modeling the outputs produced by different debayering techniques for the raw mosaic values captured by different imaging devices, and by identifying the most accurate representation of the captured scene based on a comparison of the outputs.

Process 600 may include adjusting (at 608) settings of the selected (at 606) debayering technique based on the metadata associated with the set of data points. For instance, MMM system 100 may adjust (at 608) the selected (at 606) debayering technique to convert a set of raw mosaic values to a first range of red color values when a first shutter speed is used to capture the set of raw mosaic values, and may convert the set of raw mosaic values to a second range of red color values when a second shutter speed is used to capture the set of raw mosaic values.

Process 600 may include converting (at 610) the raw mosaic values that were mapped as the descriptive characteristics and/or non-positional elements of the set of data points to color values according to the adjusted (at 608) settings of the selected (at 606) debayering technique. Process 600 may include generating (at 612) a visualization on a user interface or a display by presenting the converted (at 610) color values for each data point of the set of data points at a position in 3D space that is defined by the positional elements of that data point. In some embodiments, MMM system 100 may buffer or store the converted color values in memory or a file until all data points of the entire point cloud or 3D model have been processed, and may generate (at 612) the visualization by presenting the converted color values for all data points at the corresponding positions in 3D space.

Process 600 may include determining (at 614) if the point-accurate 3D model contains additional sets of data points with raw mosaic values that have yet to be converted. In response to determining (at 614—Yes) that all data points have been processed and/or rendered, process 600 may include presenting (at 616) the visualization for the entire point-accurate 3D model or a desired region of the point-accurate 3D model. In response to determining (at 614—No) that all the data points have not been processed and/or rendered, process 600 may include determining (at 604) a next set of data points with the same metadata that have yet to be processed, and selecting the same or a different debayering technique to convert the raw mosaic values of those data points to color values that may be rendered in conjunction with other processed data points.

Figure 7:
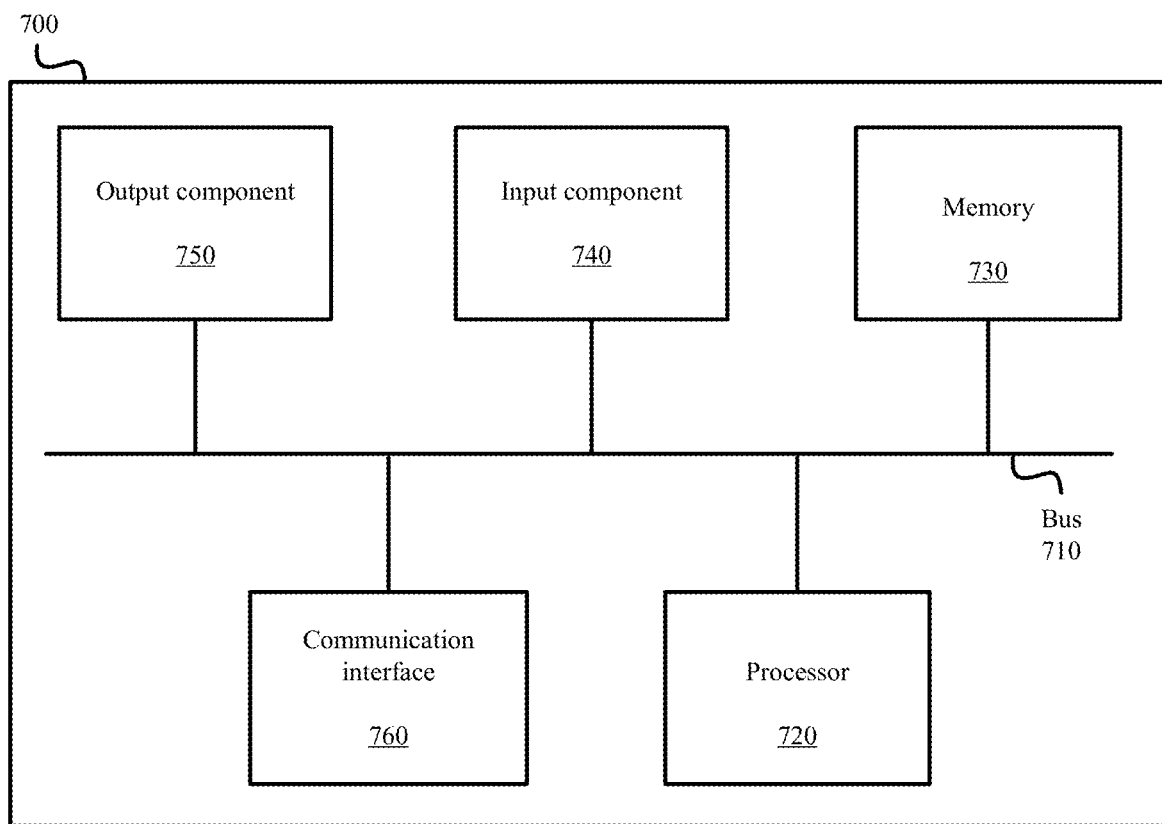
FIG. 7 illustrates example components of one or more devices, according to one or more embodiments described herein.

FIG. 7 is a diagram of example components of device 700. Device 700 may be used to implement one or more of the devices or systems described above (e.g., MMM system 100, high-resolution depth scanner 101, the set of imaging devices 103, and/or other devices for generating the point-accurate 3D models with point-accurate descriptive characteristics and for generating the visualizations from the point-accurate 3D models with point-accurate descriptive characteristics). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    determining a first position from which a first image of a scene is captured, and a second position from which a second image of the scene is captured;
    obtaining a model of the scene that is defined with different sets of positional elements, the different sets of positional elements comprising values that map to positions of different surfaces in the scene;
    determining that the second position is more aligned than the first position with a particular set of positional elements from the different sets of positional elements; and
    mapping color values from a particular pixel of a plurality of pixels of the second image to a set of non-positional elements that are defined with the particular set of positional elements in response to the second position being more aligned than the first position with the first set of positional elements.

2. The method of claim 1, wherein each set of the different sets of positional elements is associated with a surface normal, the surface normal associated with the particular set of positional elements representing a vector that is perpendicular to a particular surface represented by the particular set of positional elements.

3. The method of claim 2 further comprising:
    extending the surface normal associated with the particular set of positional elements into a space of the model; and
    wherein determining that the second position is more aligned than the first position comprises detecting that the surface normal associated with the particular set of positional elements extends to a position that is closer to the second position than the first position in the space.

4. The method of claim 2 further comprising:
    determining a direction of the surface normal associated with the particular set of positional elements; and
    wherein determining that the second position is more aligned than the first position comprises determining that the direction of the surface normal is directed closer to the second position than the first position.

5. The method of claim 2 further comprising:
    determining that the surface normal associated with the particular set of positional elements is directed to a particular photosite of a plurality of photosites that capture the second image from the second position; and
    determining that the particular photosite generates the color values of the particular pixel.

6. The method of claim 2 further comprising:
    determining a direction of the surface normal associated with the particular set of positional elements;
    detecting a position on a sensor of an imaging device at the second position that is aligned with the direction of the surface normal; and
    wherein mapping color values from the particular pixel comprises associating the color values of the particular pixel that are captured by a photosite at the position on the sensor to the set of non-positional elements.

7. The method of claim 1, wherein the color values correspond to raw mosaic values captured by one or more photosites of a device at the second position.

8. The method of claim 1 further comprising:
    determining a position and orientation of a plurality of photosites associated with an imaging device at the second position;
    determining that a particular photosite of the plurality of photosites is aligned with a position defined by the particular set of positional elements; and
    wherein mapping the color values from the particular pixel comprises associating the color values of the particular pixel that are captured by the particular photosite to the set of non-positional elements.

9. The method of claim 8, wherein determining that the particular photosite is aligned with the position defined by the particular set of positional elements comprises:
    performing a ray emulation from the position and orientation of each photosite of the plurality of photosites; and
    determining that the ray emulation from the position and orientation of the particular photosite contacts or is closest to the position defined by the particular set of positional elements.

10. The method of claim 1 further comprising:
    generating the model based on outputs of a scanner that scans the positions of the different surfaces in the scene.

11. The method of claim 1 further comprising:
    obtaining the different sets of positional elements from scanning the scene separate from capturing the first image and the second image.

12. The method of claim 1, wherein the model is a point cloud that comprises a plurality of points that are distributed across a three-dimensional ("3D") space, wherein each point of the plurality of points is defined with one of the different sets of positional elements and a set of non-positional elements with mapped color values from a different pixel of the first image or the second image.

13. The method of claim 1 further comprising:
    attributing color values from a different pixel of the first image or the second image to each of the different sets of positional-elements.

14. The method of claim 1 further comprising:
    presenting a visualization of the scene by rendering a point at each position defined by the different sets of positional elements with color values mapped from a different pixel of the first image or the second image to a set of non-positional elements that are defined with each of the different sets of positional elements.

15. A system comprising:
    one or more hardware processors configured to:
        determine a first position from which a first image of a scene is captured, and a second position from which a second image of the scene is captured;
        obtain a model of the scene that is defined with different sets of positional elements, the different sets of positional elements comprising values that map to positions of different surfaces in the scene;
        determine that the second position is more aligned than the first position with a particular set of positional elements from the different sets of positional elements; and
        map color values from a particular pixel of a plurality of pixels of the second image to a set of non-positional elements that are defined with the particular set of positional elements in response to the second position being more aligned than the first position with the first set of positional elements.

16. The system of claim 15, wherein each set of the different sets of positional elements is associated with a surface normal, the surface normal associated with the particular set of positional elements representing a vector that is perpendicular to a particular surface represented by the particular set of positional elements.

17. The system of claim 16, wherein the one or more hardware processors are further configured to:
- extend the surface normal associated with the particular set of positional elements into a space of the model; and
- wherein determining that the second position is more aligned than the first position comprises detecting that the surface normal associated with the particular set of positional elements extends to a position that is closer to the second position than the first position in the space.

18. The system of claim 16, wherein the one or more hardware processors are further configured to:
- determine a direction of the surface normal associated with the particular set of positional elements; and
- wherein determining that the second position is more aligned than the first position comprises determining that the direction of the surface normal is directed closer to the second position than the first position.

19. The system of claim 16, wherein the one or more hardware processors are further configured to:
- determine that the surface normal associated with the particular set of positional elements is directed to a particular photosite of a plurality of photosites that capture the second image from the second position; and
- determine that the particular photosite generates the color values of the particular pixel.

20. A non-transitory computer-readable medium storing a plurality of processor-executable instructions that, when executed by one or more processors, cause a computing system to perform operations comprising:
- determine a first position from which a first image of a scene is captured, and a second position from which a second image of the scene is captured;
- obtain a model of the scene that is defined with different sets of positional elements, the different sets of positional elements comprising values that map to positions of different surfaces in the scene;
- determine that the second position is more aligned than the first position with a particular set of positional elements from the different sets of positional elements; and
- map color values from a particular pixel of a plurality of pixels of the second image to a set of non-positional elements that are defined with the particular set of positional elements in response to the second position being more aligned than the first position with the first set of positional elements.

* * * * *